(12) United States Patent
Kulkarni et al.

(10) Patent No.: US 9,436,409 B2
(45) Date of Patent: *Sep. 6, 2016

(54) FAST MIGRATION OF VIRTUAL STORAGE PARTITION DATA ACROSS STORAGE SYSTEMS

(71) Applicant: NETAPP, INC., Sunnyvale, CA (US)

(72) Inventors: Aditya Rajeev Kulkarni, Bangalore (IN); Nagender Somavarapu, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/163,022

(22) Filed: Jan. 24, 2014

(65) Prior Publication Data

US 2014/0143514 A1    May 22, 2014

Related U.S. Application Data

(63) Continuation of application No. 12/766,933, filed on Apr. 26, 2010, now Pat. No. 8,683,152.

(30) Foreign Application Priority Data

Mar. 10, 2010    (IN) .............................. 626/CHE/2010

(51) Int. Cl.
G06F 3/06    (2006.01)

(52) U.S. Cl.
CPC ............. *G06F 3/065* (2013.01); *G06F 3/0604* (2013.01); *G06F 3/0607* (2013.01); *G06F 3/067* (2013.01); *G06F 3/0647* (2013.01); *G06F 3/0661* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 5,819,292 A * | 10/1998 | Hitz | ................... | G06F 11/1435 707/999.203 |
| 7,325,111 B1 * | 1/2008 | Jiang | ................... | G06F 11/1451 707/999.202 |
| 7,334,094 B2 * | 2/2008 | Fair | ................... | G06F 17/30067 707/E17.01 |
| 7,334,095 B1 * | 2/2008 | Fair | ....................... | G06F 3/0607 711/161 |
| 8,020,037 B1 * | 9/2011 | Schwartz | ............ | G06F 11/2094 714/41 |
| 2002/0116593 A1 * | 8/2002 | Kazar | ............... | G06F 17/30091 711/202 |
| 2004/0267836 A1 * | 12/2004 | Armangau | ......... | G06F 11/1435 |
| 2005/0015663 A1 * | 1/2005 | Armangau | .......... | G06F 11/2074 714/15 |
| 2005/0044162 A1 * | 2/2005 | Liang | ................ | G06F 17/30067 709/212 |
| 2005/0097260 A1 * | 5/2005 | McGovern | ............ | G06F 3/0623 711/100 |
| 2005/0144202 A1 * | 6/2005 | Chen | ................... | G06F 11/2066 |

(Continued)

*Primary Examiner* — Charles Rones
*Assistant Examiner* — Matthew Chrzanowski
(74) *Attorney, Agent, or Firm* — Cooper Legal Group, LLC

(57) ABSTRACT

A method includes reading a superblock of a read-only replica of a source virtual volume in a source virtual storage partition associated with a source aggregate of a source storage system at the destination storage system, modifying the superblock of the read-only replica in a memory of the destination storage system, and associating the modified superblock with one or more virtual volume block number (s) configured to be previously associated with the superblock of the read-only replica of the source virtual volume without initiating a destination consistency point (DCP) at the destination storage system to render the destination virtual volume writable. The method also includes modifying a disk group label to reflect an association of the destination storage disk with the writable destination virtual volume, and initiating DCP to ensure that the modified superblock and the modified disk group label are flushed to the destination storage disk.

18 Claims, 8 Drawing Sheets

(56) References Cited

U.S. PATENT DOCUMENTS

| | | | | |
|---|---|---|---|---|
| 2005/0246401 A1* | 11/2005 | Edwards | ............ | G06F 17/30233 |
| 2005/0246503 A1* | 11/2005 | Fair | .................. | G06F 17/30067 711/147 |
| 2007/0067256 A1* | 3/2007 | Zayas | ............... | G06F 17/30067 |
| 2007/0083568 A1* | 4/2007 | McGovern | ........ | G06F 17/30188 |
| 2007/0118687 A1* | 5/2007 | McGovern | ............ | G06F 3/0623 711/112 |
| 2009/0030983 A1* | 1/2009 | Malaiyandi | ......... | G06F 11/1076 709/204 |
| 2010/0138605 A1* | 6/2010 | Kazar | .................. | G06F 3/0611 711/114 |
| 2011/0078405 A1* | 3/2011 | Asano | .................. | G06F 3/0607 711/170 |

\* cited by examiner

FAST MIGRATION OF VIRTUAL STORAGE PARTITION DATA ACROSS STORAGE SYSTEMS

CLAIM OF PRIORITY

This application is a continuation of co-pending application Ser. No. 12/766,933, filed on Apr. 26, 2010, which claims priority from Indian provisional application number 626/CHE/2010 titled "FAST MIGRATION OF VIRTUAL STORAGE PARTITION DATA ACROSS STORAGE SYSTEMS" filed on Mar. 10, 2010, the disclosures of which are incorporated herein by reference in their entirety.

FIELD OF TECHNOLOGY

This disclosure relates generally to data migration and, more particularly, to a method, an apparatus and a system of migration of virtual storage partition data between storage systems.

BACKGROUND

Data migration between storage systems (e.g., from a source storage system to a destination storage system) may be important during processes such as disaster recovery, load-balancing, system migration and/or remote "read-only" data access provisioning. During data migration, data in volumes of virtual storage partitions on a source storage system may be mirrored in virtual storage partitions on the destination storage system.

To make a minored volume writable, relationships between a source data and a mirror data at the destination storage system (e.g., relationships enforced by a replication engine associated with a data replication process) may need to be broken. The process of breaking the relationships between the source data and the mirror data at the destination storage system may involve time-consuming sub-processes (e.g., consistency points (CPs), registry updates). Furthermore, the process of breaking the relationships between the source data and the mirror data at the destination may involve operating one volume at a time.

When the time consumed in the abovementioned processes exceeds time limits permitted by application time-outs, the data migration may lead to application downtime. The inherent latencies in the abovementioned data migration process may result in loss of revenue and/or reduced productivity. As a result, productivity may suffer and/or revenues may be lost.

SUMMARY

Disclosed are a method, an apparatus and a system of migration of virtual storage partition data between storage systems.

In one aspect, a method includes reading, through a file system at a destination storage system, a superblock of a read-only replica of a source virtual volume in a source virtual storage partition associated with a source aggregate of a source storage system at the destination storage system. The read-only replica of the source virtual volume is transferred from the source storage system to a destination virtual storage partition associated with a destination aggregate at the destination storage system through a replication engine associated with the source storage system and the destination storage system.

The source virtual volume and the read-only replica at the destination virtual storage partition are respectively abstracted from an underlying source storage disk associated with the source storage system and an underlying destination storage disk associated with the destination storage system through the source aggregate and the destination aggregate inside which the source virtual volume and a destination virtual volume signifying the read-only replica are created. The source virtual storage partition and the destination virtual storage partition are, respectively, secure logical partitions of the source storage system and the destination storage system created by an operating system associated therewith.

The method also includes modifying the superblock of the read-only replica in a memory of the destination storage system to clear a replica flag associated therewith through the replication engine, and associating, through the file system at the destination storage system, the modified superblock with one or more virtual volume block number(s) (virtual VBNs) configured to be previously associated with the superblock of the read-only replica of the source virtual volume of the source storage system without initiating a destination consistency point (DCP) at the destination storage system to render the destination virtual volume writable.

The virtual VBN is configured to index a virtual volume level version of block allocation files of a virtual volume including the source virtual volume and/or the destination virtual volume, and the DCP defines a process during which an operating system associated with the destination storage system flushes data changes in the memory of the destination storage system to the destination storage disk associated with the destination storage system.

Further, the method includes modifying a disk group label indicating an association of the destination storage disk with the read-only replica of the source virtual. volume of the source storage system to reflect an association of the destination storage disk with the writable destination virtual volume, and initiating the DCP to ensure that the modified superblock and the modified disk group label associated with the writable destination virtual volume are flushed to the destination storage disk.

In another aspect, a method includes freezing, in a number of destination virtual volumes of a destination virtual storage partition associated with a destination aggregate of a destination storage system, each destination virtual volume signifying a read-only replica of a corresponding source virtual volume in a source virtual storage partition associated with a source aggregate of a source storage system at the destination storage system through a file system associated therewith.

The freezing is configured to queue a subsequent external request through a client device to access data associated with the each destination virtual volume. The read-only replica of the corresponding source virtual volume is transferred from the source storage system to the each destination virtual volume through a replication engine associated with the source storage system and the destination storage system. The corresponding source virtual volume and the each destination virtual volume are respectively abstracted from an underlying source storage disk associated with the source storage system and an underlying destination storage disk associated with the destination storage system through the source aggregate and the destination aggregate inside which the corresponding source virtual volume and the each destination virtual volume are created.

The source virtual storage partition and the destination virtual storage partition are, respectively, secure logical partitions of the source storage system and the destination storage system created by an operating system associated therewith. The method also includes flushing data associated with the each destination virtual volume in a memory of the destination storage system to the destination storage disk, reading, through the file system at the destination storage system, a superblock of the each destination virtual volume, and modifying the superblock of the each destination virtual volume in the memory of the destination storage system to clear a replica flag associated therewith through the replication engine.

Further, the method includes associating, through the file system at the destination storage system, the modified superblock with one or more virtual VBN(s) configured to be previously associated with the read-only replica of the corresponding source virtual volume without initiating a DCP at the destination storage system to render the each destination virtual volume writable, and modifying a disk group label indicating an association of the destination storage disk with the read-only replica of the corresponding source virtual volume to reflect an association of the destination storage disk with the writable each destination virtual volume.

The virtual VBN is configured to index a virtual volume level version of block allocation files of a virtual volume including the corresponding source virtual volume and/or the each destination virtual volume. The DCP defines a process during which an operating system associated with the destination storage system flushes data changes in the memory of the destination storage system to the destination storage disk associated with the destination storage system.

Still further, the method includes initiating the DCP to ensure that the modified superblock and the modified disk group label associated with the writable each destination virtual volume are flushed to the destination storage disk, remounting, in parallel, the writable each destination virtual volume in a thread associated therewith through the file system associated therewith, and unfreezing the remounted writable each destination virtual volume through the file system associated therewith.

In yet another aspect, a storage environment includes a destination storage system including a processor, a memory and a destination aggregate implemented therein, and a destination storage disk associated with the destination storage system. The memory includes storage locations configured to be addressable by the processor. A destination virtual volume of a destination virtual storage partition of the destination storage system signifies a read-only replica of a source virtual volume in a source virtual partition of a source storage system.

The source virtual volume is configured to be abstracted from a source storage disk through a source aggregate configured to be associated with the source virtual. storage partition, and the destination virtual volume is configured to be abstracted from the destination storage disk through the destination aggregate configured to be associated with the destination virtual storage partition. The read-only replica of the source virtual volume is transferred from the source storage system to the destination storage system through a replication engine associated with the source storage system and the destination storage system.

Instructions associated with the replication engine are stored in the memory of the destination storage system. The source virtual storage partition and the destination virtual storage partition are, respectively, secure logical partitions of the source storage system and the destination storage system created by an operating system associated therewith.

The operating system of the destination storage system is configured to implement a file system therein. The file system at the destination storage system is utilized to read a superblock of the read-only replica of the source virtual volume at the destination storage system through the processor and the memory of the destination storage system.

The superblock of the read-only replica is modified in the memory of the destination storage system through the replication engine to clear a replica flag associated therewith. The file system at the destination storage system is utilized to associate the modified superblock with one or more virtual VBN(s) configured to be previously associated with the superblock of the read-only replica of the source virtual volume without initiating a DCP at the destination storage system and to render the destination virtual volume writable. The virtual VBN is configured to index a virtual volume level version of block allocation files of a virtual volume including the source virtual volume and/or the destination virtual volume.

The DCP defines a process during which the operating system associated with the destination storage system flushes data changes in the memory of the destination storage system to the destination storage disk. A disk group label indicating an association of the destination storage disk with the read-only replica of the source virtual volume is modified at the memory of the destination storage system to reflect an association of the destination storage disk with the writable destination virtual volume. The DCP is initiated to ensure that the modified superblock and the modified disk group label associated with the writable destination virtual volume are flushed to the destination storage disk.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to realize migration of virtual storage partition data between storage systems. Although the present embodiments have been described with reference to specific example embodiments, it will be evident that various modifications and changes may be made to these embodiments without departing from the broader spirit and scope of the various embodiments.

Figure 1:
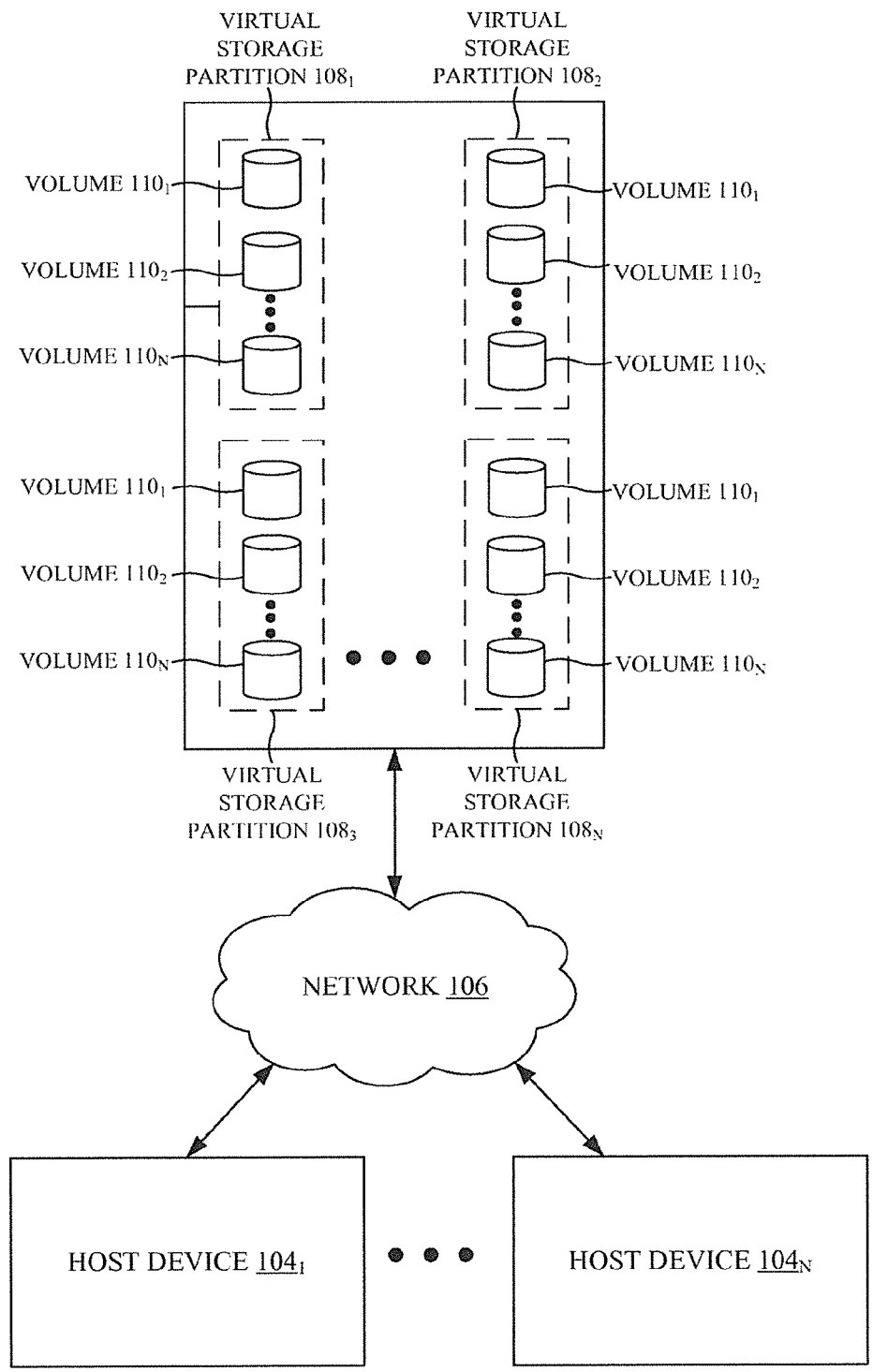
FIG. 1 is a schematic view of a storage system interfaced with a number of host devices through a network, according to one or more embodiments.

FIG. 1 shows a storage system 102 interfaced with a number of host devices $104_{1-N}$ through a network 106, according to one or more embodiments. In one or more embodiments, host devices $104_{1-N}$ may be general-purpose computing devices configured to execute applications (e.g., database applications). In one or more embodiments, network 106 may be a storage area network (SAN), a local area network (LAN), a wide area network (WAN), a virtual private network (VPN) using communication links over, for example, the Internet, or any combination thereof. In one or more embodiments, storage system 102 may directly communicate with host devices $104_{1-N}$ as a Network Attached Storage (NAS) device or a Direct Attached Storage (DAS) device. In one or more embodiments, storage system 102 may operate in a hybrid SAN-NAS environment. For example, storage system 102 may offer file-serving capabilities, and may also serve data blocks over a Fiber Channel SAN.

In one or more embodiments, host devices $104_{1-N}$ may indicate customers of services provided through network 106 or users associated with an organization (e.g., an Information Technology (IT) organization). In one or more embodiments, each host device $104_{1-N}$ may have storage associated therewith. For the aforementioned purpose, in one or more embodiments, isolated logical virtual storage partitions $108_{1-N}$ may be created on storage system 102 through an operating system associated with storage system 102. In one or more embodiments, therefore, each virtual storage partition $108_{1-N}$ may be associated with a host device $104_{1-N}$. In one or more embodiments, information on a secured virtual storage partition $108_{1-N}$ may solely be accessed by the host device $104_{1-N}$ associated therewith.

For example, virtual storage partitions $108_{1-N}$ may be virtual filers (NetApp®'s vFiler™ units) that are virtual storage controllers operating within NetApp®'s Data ONTAP® operating system. In one or more embodiments, the operating system associated with storage system 102 may also be configured to enable migration of virtual storage partitions $108_{1-N}$ between storage system 102 and another storage system. In one or more embodiments, each virtual storage partition $108_{1-N}$ may include data stored in volumes $110_{1-N}$. in one or more embodiments, a volume $110_{1-N}$ may be an instantiation of an individual file system having a Redundant Array of Independent Disks (RAID) label associated therewith. In one or more embodiments, two or more disks may be part of a RAID group.

In one or more embodiments, the root directory of a volume $110_{1-N}$ may include a special subdirectory called a quota tree (qtree). In one or more embodiments, the qtree may be configured to provide flexibility to storage when storage does not require multiple volumes $110_{1-N}$. In one or more embodiments, each virtual storage partition $108_{1-N}$ may include multiple volumes $110_{1-N}$, as shown in FIG. 1. In one or more embodiments, each virtual storage partition $108_{1-N}$ may also include information (e.g., Internet Protocol (IP) addresses, network configuration) required to securely route data to the appropriate virtual storage partition $108_{1-N}$.

In one or more embodiments, as described above, data associated with a virtual storage partition $108_{1-N}$ may not be accessed by another virtual storage partition $108_{1-N}$. In one or more embodiments, storage system 102 may be configured to map each volume $110_{1-N}$ (and qtree, if applicable) to the corresponding virtual storage partition $108_{1-N}$. In one or more embodiments, again as described above, an entire virtual storage partition $108_{1-N}$ may be migrated from storage system 102 to another storage system with minimal disruption of ongoing activity therein.

in one or more embodiments, the operating system associated with storage system 102 may support data sets associated with protocols including but not limited to Network File System (NFS) protocol, Common Internet File System (CIFS) protocol, Internet Small Computer System Interface (iSCSI) protocol, Hypertext Transfer (HTTP) protocol, File Transfer Protocol (FTP), FTP-Secure (FTPS) protocol, Secure File Transfer Protocol (SFTP), and Network Data Management Protocol (NDMP).

In one or more embodiments, a volume $110_{1-N}$ may be created on top of one or more RAID groups, where each RAID group may include M data disks and a parity disk. In one or more embodiments, the number of bits in data blocks of the M data disks may be added up and stored in the parity disk, which may be used in conjunction with the surviving bits on disks to facilitate data recovery during failure of a disk. In one or more embodiments, the disk failure may increase the possibility of another failure during the disk rebuild process, which may take a lot of time to complete.

In one or more embodiments, therefore, each RAID group may include M data disks and two parity disks, which provides the ability to withstand a loss of up to two disks. Here, the additional disk may provide coverage during the abovementioned disk rebuild process. In one or more embodiments, each of the disks in the RAID group may include some portion therein allocated for the RAID label to store metadata that indicates the association of the disk with a volume $110_{1-N}$. In one or more embodiments, in order to increase the size of volume $110_{1-N}$, more disks may need to be added. In one or more embodiments, for improved performance, full RAID groups may need to be added at a time.

In one or more embodiments, for at least the reasons described above, the granularity may be fixed, i.e., the association of disks and volumes $110_{1-N}$ may be inflexible. In one or more embodiments, sizing of volumes $110_{1-N}$ may be based on physical disk sizes, and carving out volumes $110_{1-N}$ based on required capacity may not be possible. In one or more embodiments, resource utilization may also not be optimal. For example, if there is a small-sized volume requirement, a physical disk may still need to be wasted.

In one or more embodiments, a layer of abstraction may be added between the disks and volumes $110_{1-N}$ through aggregates. In one or more embodiments, smaller utilizable volumes may be created through an aggregate. In one or more embodiments, P disks may be allocated to an aggregate, which is built RAID groups analogous to volumes $110_{1-N}$. In one or more embodiments, an aggregate may not include a file system, and may merely include allocatable space therein.

Figure 2:
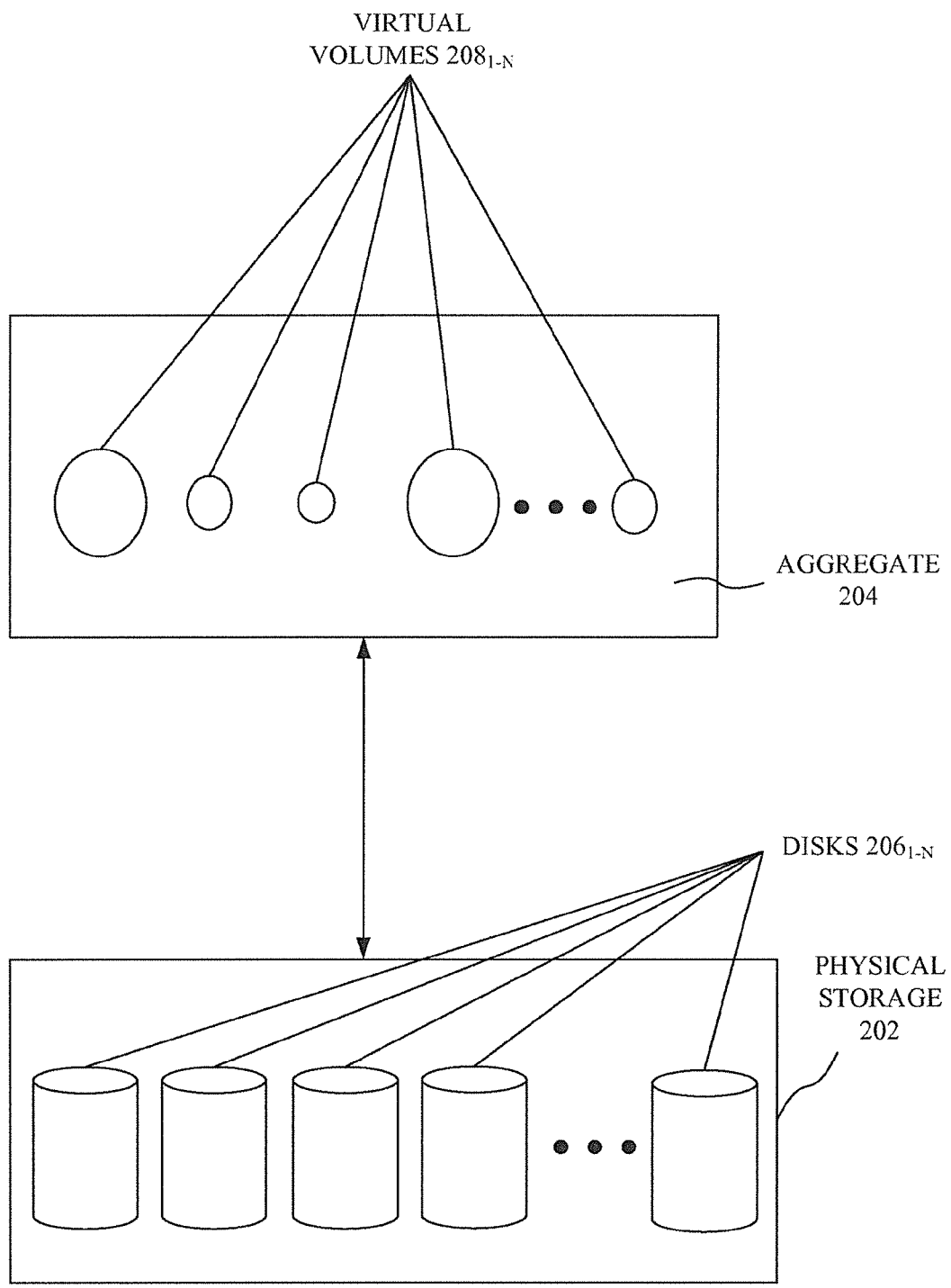
FIG. 2 is a schematic view of an aggregate on top of physical storage, according to one or more embodiments.

FIG. 2 shows an aggregate 204 on top of physical storage 202, according to one or more embodiments. In one or more embodiments, physical storage 202 may include disks $200_{1-N}$. In one or more embodiments, aggregate 204 and the underlying disks $206_{1-N}$ may be defined by a storage administrator. In one or more embodiments, aggregate 204 may include virtual volumes $208_{1-N}$ configured to grow or shrink without being constrained by the characteristics of the underlying physical storage 202. In one or more embodiments, virtual volumes $208_{1-N}$ may automatically utilize all spindles in aggregate 204 to provide performance improvement, regardless of the size thereof. Therefore, in one or more embodiments, storage may be controlled by configuring aggregate 204/virtual volumes $208_{1-N}$ to suit changing requirements and needs thereof.

In one or more embodiments, aggregate 204 may be analogous to volume $110_{1-N}$, and virtual volumes $208_{1-N}$ may be analogous to a file within volume $110_{1-N}$. For example, creating a 20 GB file in volume $110_{1-N}$ may be analogous to creating a 20 GB virtual volume $208_{1-N}$ in aggregate 204. In one or more embodiments, aggregate 204 may include one or more files, with each file having a virtual volume $208_{1-N}$.

In one or more embodiments, as discussed above, the operating system associated with storage system 102 may be configured to enable migration of virtual storage partitions $108_{1-N}$ between storage system 102 and another storage system. In one or more embodiments, transparent migration of virtual storage partitions $108_{1-N}$ between storage systems without the infliction of application downtime may be required. Example scenarios associated with transparent migration (i.e., migration transparent to applications) include but are not limited to migration from a medium-end virtual storage partition $108_{1-N}$ to a high-end virtual storage partition $108_{1-N}$ for performance reasons, and migration from one aggregate 204 to another aggregate due to space constraints. In addition, backups of virtual storage partitions $108_{1-N}$ may be created to aid in disaster recovery.

For example, if important volume $110_{1-N}$ data may be replicated to a different physical location, volume $110_{1-N}$ data may still be available after a disaster (e.g., data corruption, natural disaster at source location, accidental deletion of data). The client at host device $104_{1-N}$ may access the replicated data across network 106 until normalcy is restored at the source location, following which data may be transferred back thereto and/or retained at the destination.

In one or more embodiments, data access may be provided through data migration to local clients (e.g., local host devices $104_{1-N}$) to enable fast and efficient use of source data through read-only versions thereof. In one or more embodiments, this may help reduce network 106 utilization. In one or more embodiments, load-sharing may be implemented, whereby all read-only activities associated with source data may be "out-sourced" to read-only mirrors of the source data at a destination location. Again, in one or more embodiments, the read-only mirrors may be made writable following a disaster at the source location.

In one or more embodiments, during the abovementioned transparent migration, a virtual storage partition $108_{1-N}$ may be replicated to a new storage system, and application Input/Output (I/O) may be switched to the new storage system. In one or more embodiments, in order to achieve transparency, data may be periodically replicated to the migration destination asynchronously using a replication engine (e.g., NetApp®'s SnapMirror®). In one or more embodiments, when conditions are appropriate for switching over to the destination storage system, the replication engine may be configured to operate in a semi-synchronous mode; whenceforth the cutover process may be started. In one or more embodiments, therefore, the cutover may be defined as the point within the data migration process when the conditions are appropriate for switching over to the destination side.

In one or more embodiments, data migration described above may be initiated through a user at a host device $104_{1-N}$. For example, the user may press a button in a Graphical User interface (GUI) indicating an initiation of the data migration process. In one or more embodiments, during the cutover period, the corresponding host device $104_{1-N}$ may experience a pause. In one or more embodiments, at the high-level, the cutover process may include effectively fencing I/O at source volume $110_{1-N}$, replicating data to the destination volume/storage system, converting the read-only replica at the destination to a writable volume, and then resuming I/O on the destination volume. In one or more embodiments, the time taken by the cutover process may be governed by application timeouts. Therefore, in one or more embodiments, there exists an upper limit to the time taken by the cutover process, which may be governed by application timeouts.

It is obvious that I/O at source volume $110_{1-N}$ may be resumed therein after the process of converting the read-only replica at the destination to a writable volume is complete if data associated with source volume $110_{1-N}$ is to be retained at the source location.

In one or more embodiments, converting the read-only replica to a writable volume may involve operating on a single volume $110_{1-N}$ at a time, and may involve a number of consistency points (CPs). In one or more embodiments, CP may be the process by which the operating system flushes "in-core" storage system 102 data changes to the disk. In one or more embodiments, the operation on a single volume $110_{1-N}$ at a time may serialize the process of converting the read-only replica data to a writable volume.

Figure 3:
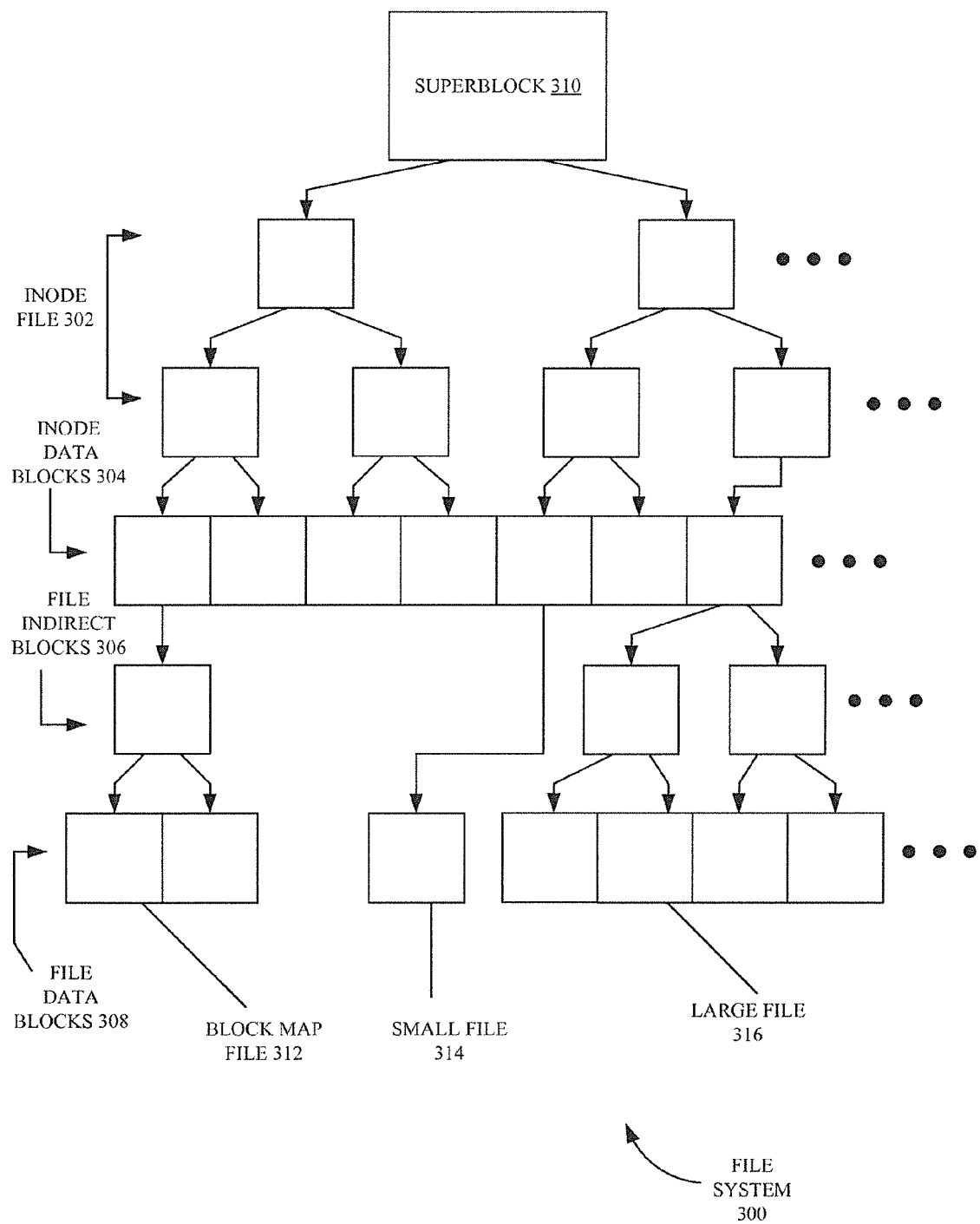
FIG. 3 is a schematic view of a tree organization of a file system of a volume, according to one or more embodiments.

In one or more embodiments, a number of checks may be performed with respect to volume $110_{1-N}$ under consideration during the conversion from read-only replica to a writable volume. In order to understand the inefficiency of the conversion of a read-only replica of a source volume $110_{1-N}$ to a writable volume (analogous to source volume $110_{1-N}$) at the destination, it may be prudent to discuss the file system (e.g., NetApp®'s Write Anywhere File Layout™ (WAFL™) file system) associated therewith and the communication between a source storage system including the source volume $110_{1-N}$ and the destination storage system including the destination volume. It is obvious source volume $110_{1-N}$ and the destination volume are analogous to one another, and that the $110_{1-N}$ label reference may apply to both for the sake of convenience. FIG. 3 shows a tree organization of file system 300 of volume $110_{1-N}$, according to one or more embodiments. In one or more embodiments, file system 300 may include data structures configured to implement a hierarchical namespace of files and directories.

In one or more embodiments, each file of file system 300 may be described by an inode, which includes metadata associated with the file and pointers to file data blocks 308 or file indirect blocks 306. In one or more embodiments, for small files 314, the inode may point directly to file data blocks 308, as shown in FIG. 3. In one or more embodiments, the modes of small files 314 may include addresses of all file data blocks 308 that include the file data. In one or more embodiments, for large files 316, the mode may point to trees of file indirect blocks 306. In one or more embodiments, as a large file 316 may utilize a lot of data blocks for the corresponding inode to directly address, the mode may point to trees of file indirect blocks 306 large enough to include all data block addresses. In one or more embodiments, all inodes in file system 300 may be stored in inode file 302 that, again, may include trees of indirect inode blocks. In one or more embodiments, inode data may be associated with mode data blocks 304. In one or more embodiments, the block allocation bitmap may be stored in block map file 312.

Figure 4:
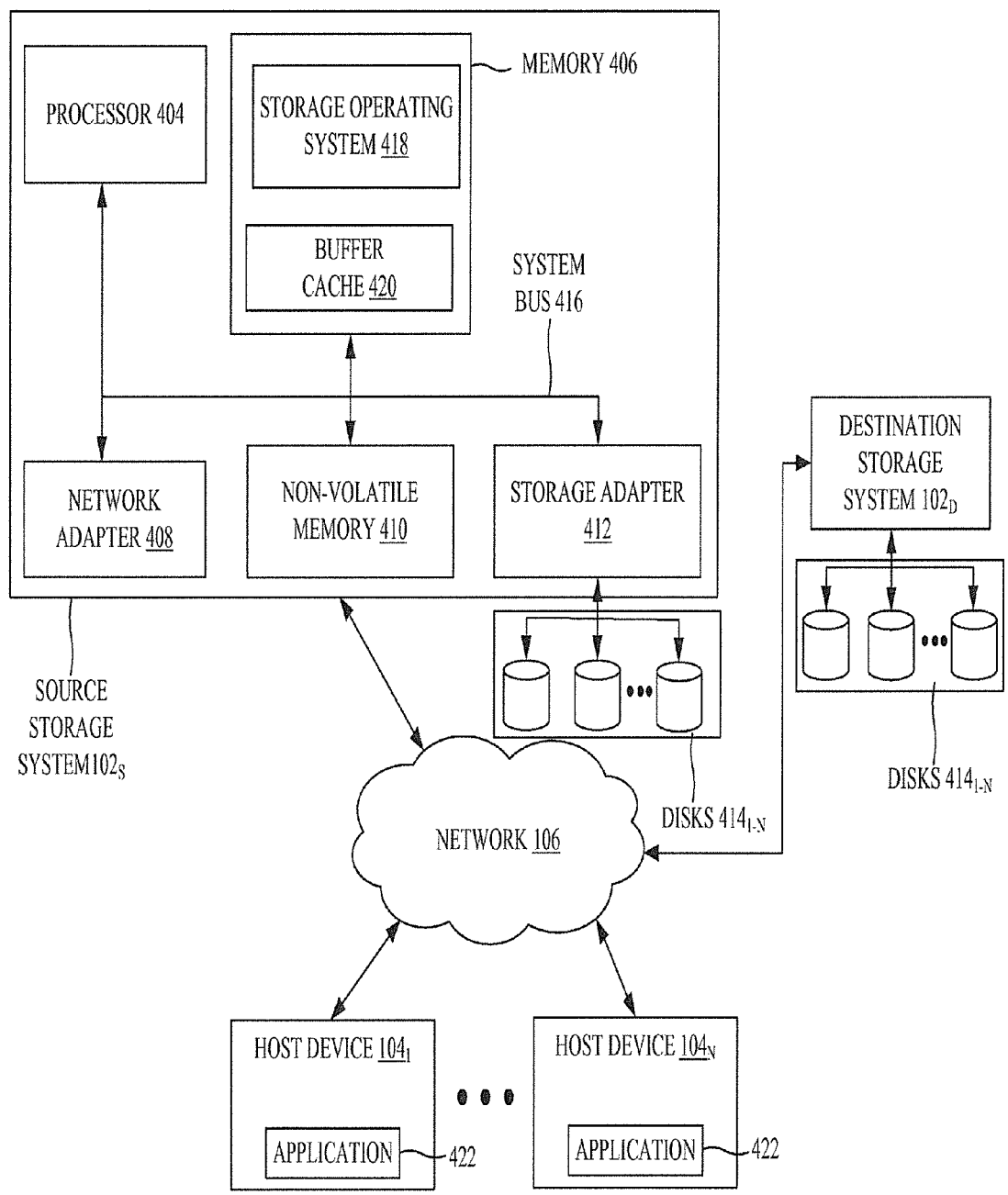
FIG. 4 is an expanded view of the communication between a source storage system and a destination storage system, according to one or more embodiments.

In one or more embodiments, superblock 310 may form the topmost level of file system 300, and may include the mode describing inode file 302. In one or more embodiments, the data structures of file system 300 form a tree, as shown in FIG. 3, with the root of the tree being superblock 310. FIG. 4 shows an expanded view of the communication between source storage system $102_S$ and destination storage system $102_D$, according to one or more embodiments. As the source storage system $102_S$ and destination storage system $102_D$ are analogous to one another, the same label (specifically, 102) may apply thereto.

In one or more embodiments, each of source storage system $102_S$ and destination storage system $102_D$ may be a computing device configured to organize information on disks $414_{1-N}$. In one or more embodiments, each storage system ($102_S$, $102_D$) may include a processor 404, a memory 406, a network adapter 408, a non-volatile memory 410 and a storage adapter 412 configured to be interconnected through a system bus 416. Here, the constituents of destination storage system $102_D$ have been left out for clarity sake because destination storage system $102_D$, as discussed above, is analogous to source storage system $102_S$.

In one or more embodiments, each storage system ($102_S$, $102_D$) may include storage operating system 418 configured to implement file system 300 as a hierarchical structure of files, directories and blocks on disks $414_{1-N}$. In one or more embodiments, memory 406 may include a buffer cache 420 (e.g., volatile memory) configured to store data structures passed between disks $414_{1-N}$ and network 106 during operation. In one or more embodiments, memory 406 may also be configured to store software code (e.g., instructions associated with the replication engine), and may include storage locations configured to be addressable by processor 404. In one or more embodiments, processor 404 and the adapters may include processing elements and/or logic circuitry configured to execute instructions in memory 406 and to manipulate the data structures. In one or more embodiments, each storage system ($102_S$, $102_D$) may also include non-volatile memory 410 (e.g., Non-Volatile Random Access Memory (NVRAM)) configured to provide fault-tolerant back-up of data to enable survival of storage system ($102_S$, $102_D$) during power failure and/or other faults.

In one or more embodiments, network adapter 408 may be configured to couple storage system ($102_S$, $102_D$) to host devices $104_{1-N}$ through network 106. In one or more embodiments, storage adapter 410 may be configured to communicate with storage operating system 418 to access information requested through host devices $104_{1-N}$. In one or more embodiments, host devices $104_{1-N}$ may be configured to execute applications 422. In one or more embodiments, a host device $104_{1-N}$ may be configured to interact with storage system ($102_S$, $102_D$) according to a client/server model of information delivery. For example, host device $104_{1-N}$ may request the services of storage system ($102_S$, $102_D$), and storage system ($102_S$, $102_D$) may return the results (e.g., through packets) through network 106.

In one or more embodiments, storage of information may be implemented as volumes $110_{1-N}$, and may include disks $414_{1-N}$ configured to implement a logical arrangement of volume block number (VBN) space on volumes $110_{1-N}$. In one or more embodiments, each logical volume $110_{1-N}$ may be associated with file system 300, as discussed above. In one or more embodiments, file system 300 may include a continuous range of VBNs starting from 0 to n, for a file system 300 of (n−1) blocks. In one or more embodiments, disks $414_{1-N}$ within a volume $110_{1-N}$ may be organized as one or more RAID groups, again as discussed above. In one or more embodiments, to facilitate access to disks $414_{1-N}$, storage operating system 418 may implement a "write-anywhere" file system 300 (e.g., NetApp®'s WAFL™ file system) to virtualize the storage space provided by disks $414_{1-N}$.

In one or more embodiments, the "write-anywhere" file system 300 may not overwrite data on disks $414_{1-N}$. In one or more embodiments, if a data block is retrieved from disk $414_{1-N}$ onto memory 406 of storage system ($102_S$, $102_D$) and updated/modified with new data, the data block may thereafter be written to a new location on disk $414_{1-N}$. An example of the "write-anywhere" file system 300 is the WAFL™ file system available from Network Appliance, Inc., Sunnyvale, Calif.

In one or more embodiments, file system 300 may logically organize information on disks $414_{1-N}$, as shown in FIG. 3. In one or more embodiments, as soon as the cutover process is initiated, source volume $110_{1-N}$ I/O may be fenced through an Application Programming interface (API) associated with file system 300 at source storage system $102_S$. In one or more embodiments, the fencing of source volume $110_{1-N}$ I/O may lead to subsequent client-initiated external requests (e.g., requests for source volume $110_{1-N}$ data) through host devices $104_{1-N}$ not being served. For example, a communication failure may be indicated to the client (e.g., a user of host device $104_{1-N}$) of host device $104_{1-N}$ initiating the "subsequent" request. In one or more embodiments, at the volume level, no further I/O through source volume $110_{1-N}$ may be possible.

In one or more embodiments, the "in-core" data (e.g., data in buffer cache 420, non-volatile memory 410, and not in disks $414_{1-N}$) associated with source volume $110_{1-N}$ on source storage system $102_S$ may then be unloaded to the corresponding disk $414_{1-N}$. Meanwhile, in one or more embodiments, data from source volume $110_{1-N}$ may be replicated to destination volume $110_{1-N}$ on destination storage system $102_D$ as follows.

In one or more embodiments, the first operation in the data replication process prior to the cutover may involve a one-time baseline transfer of the entire data associated with source volume $110_{1-N}$. In one or more embodiments, the baseline transfer may include creation of a baseline copy of file system 300 associated with source volume $110_{1-N}$, which may be a Snapshot copy, i.e., a read-only, point-in-time image of file system 300 associated with source volume $110_{1-N}$. Snapshot is a trademark of NetApp, Inc. in the US and other countries. Then, in one or more embodiments, all data blocks referenced by the Snapshot copy (and any previous copies) are transferred and written to the destination file system 300 associated with destination volume $110_{1-N}$. Thus, the source and destination file systems 300 may have at least one Snapshot copy in common. In one or more embodiments, after the first operation is complete, scheduled and/or manually triggered updates may occur.

Here, each update may transfer only new and changed blocks since the previous transfer from the source file system 300 to the destination file system 300.

Here, when the source storage system $102_S$ creates a Snapshot copy, the new copy may be compared to the baseline copy to determine the changed/new blocks. Thus, in one or more embodiments, the new/changed blocks may be transmitted to the destination and written to the destination file system 300. Now, in one or more embodiments, file systems 300 at both the source and the destination have the new Snapshot copy, which may now be the baseline copy for a subsequent update.

In one or more embodiments, for the abovementioned baseline transfer, the replication engine provided in source storage system $102_S$ (and destination storage system $102_D$) may operate in an asynchronous mode. In one or more embodiments, once the baseline transfer is done, the cutover process may begin, where the replication engine may switch to a semi-synchronous mode of operation. Here, in one or more embodiments, data replication occurs at the granularity of a CP. In one or more embodiments, in the semi-synchronous mode of operation, a CP may be triggered under certain conditions (e.g., non-volatile memory 410 journal being half-full or 10 seconds having passed since the most recent CP, whichever occurs earlier). In one or more embodiments, once a CP is triggered, storage operating system 418 may utilize transactional data stored in memory 406 (e.g., buffer cache 420) to create a list of data block changes that need to be written to disk $414_{1-N}$. In one or more embodiments, once the list is ready, source file system 300 may transmit the list of data blocks to be written to disk $414_{1-N}$. In one or More embodiments, the list of data blocks may also be transmitted (e.g., through network 106) to the destination storage system $102_D$, where a data write is initiated too.

Thus, in one or more embodiments, the list data blocks may be written out to disk $414_{1-N}$ at both the source storage system $102_S$ and the destination storage system $102_D$. In one or more embodiments, a block-level replication of source volume $110_{1-N}$ may be effected at the destination. In one or more embodiments, during the data replication process, the replication engine may mark the destination volume $110_{1-N}$ as a replica through a replica flag (e.g., a bit/a few bits). In one or more embodiments, this may allow for the destination volume $110_{1-N}$ to be a "read-only" replica, thereby rendering data associated therewith unalterable. In one or more embodiments, the relationships between source volume $110_{1N}$ and the destination read-only replica may be included in control file(s) that are part of the replication engine.

In one or more embodiments, the process of converting the read-only replica at the destination to a writable volume may then be started. For the aforementioned function, in one or more embodiments, the replication engine relationships between source volume $110_{1-N}$ and the destination read-only replica may need to be broken. In other words, the replica flag associated with the read-only replica may need to be cleared.

in one or more embodiments, during the process of converting from a read-only replica to a writable volume, I/O (e.g., through a client/user of host device $104_{1-N}$) to the destination volume $110_{1-N}$ may be queued until the process is complete, and requests may then be served in the order in which they were received/in a priority order. Thus, in one or more embodiments, destination volume $110_{1-N}$ may be "frozen" at the volume level. In one or more embodiments, this may be achieved through an API associated with destination file system 300. In one or more embodiments, a client/user initiating an external request (e.g., requests for data from destination volume $110_{1-N}$) may notice a slow-down in the request being addressed due to the aforementioned "freezing" of destination volume $110_{1-N}$. In one or more embodiments, the "in-core" data of the read-only replica, i.e., destination volume $110_{1-N}$, in the destination storage system $102_D$ may be unloaded to the disk $414_{1-N}$ associated therewith, as discussed above.

In one or more embodiments, the superblock of destination file system 300 associated with the read-only replica may be stored in a VBN associated therewith. In one or more embodiments, the superblock associated with the read-only replica may also be stored at another VBN for redundancy/fault-tolerance purposes. In one or more embodiments, this superblock may then first be read at the destination storage system $102_D$. Then, in one or more embodiments, the replica flag associated therewith may be cleared, and the superblock may be modified. For example, the modification may be in the form of the replication engine writing metadata indicating the read/writable status of destination volume $110_{1-N}$. In one or more embodiments, then the modified superblock may be written at the VBN where the superblock of the read-only replica was stored. In one or more embodiments, then a CP may be triggered (e.g., manually) to ensure that the modified superblock is unloaded/flushed to disk $414_{1-N}$. In one or more embodiments, this may ensure that the modification is made permanent. In one or more embodiments, the modified superblock may again be written at another VBN space (e.g., a VBN at which the superblock of the read-only replica was stored) for redundancy/fault-tolerance purposes. In one or more embodiments, a CP may again be triggered (e.g., manually) to ensure that the modified superblock is unloaded/flushed to disk $414_{1-N}$.

For example, the modified superblocks may be located at two consecutive VBNs. Then, in one or more embodiments, the RAID label indicating the association of disk $414_{1-N}$ with the destination volume $110_{1-N}$ may be appropriately modified. In one or more embodiments, in order to ensure that the modified RAID label is unloaded/flushed to disk, a CP may again be triggered (e.g., manually). In one or more embodiments, the destination volume $110_{1-N}$ may then be remounted using the destination file system 300. After the remounting, in one or more embodiments, the destination volume $110_{1-N}$ may be thawed, i.e., "unfrozen." Finally, the relevant registry entry for the destination volume $110_{1-N}$ may be updated. In one or more embodiments, the registry associated with destination volumes $110_{1-N}$ may be located in non-volatile memory 410 of the destination storage system $102_D$, and may include metadata associated therewith. Now, the destination volume $110_{1-N}$ may be ready to serve the queued requests.

Figure 5:
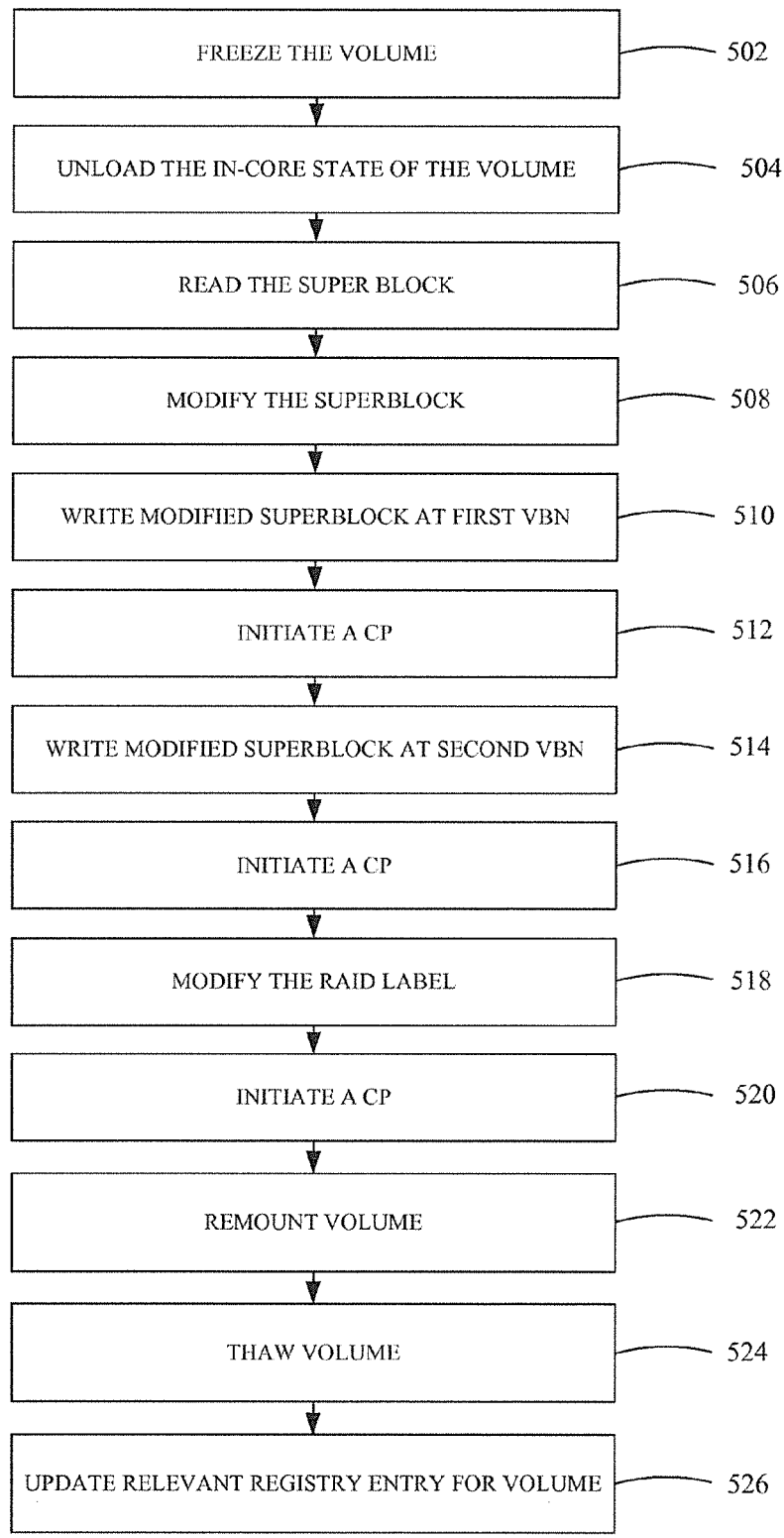
FIG. 5 is a process flow diagram detailing the operations involved in converting a read-only replica of a source volume at a destination to a writable volume, according to one or more embodiments.

FIG. 5 is a process flow diagram summarizing the abovementioned operations involved in converting a read-only replica at the destination to a writable volume, according to one or more embodiments. In one or more embodiments, operation 502 may involve freezing destination volume $110_{1-N}$. In one or more embodiments, operation 504 may involve unloading the "in-core" state of destination volume to disk $414_{1-N}$ associated therewith. In one or more embodiments, operation 506 may involve reading the superblock of file system 300 associated with destination volume $110_{1-N}$ at a VBN. In one or more embodiments, operation 508 may involve modifying the superblock, as described above. In one or more embodiments, operation 510 may involve writing the modified superblock at a first VBN.

In one or more embodiments, operation 512 may involve initiating a CP to ensure that the modified superblock is flushed to disk $414_{1-N}$ associated therewith. In one or more embodiments, operation 514 may involve writing the modified superblock at a second VBN. In one or more embodiments, operation 516 may involve initiating a CP to ensure that the modified superblock is flushed to disk $414_{1-N}$ associated therewith. In one or more embodiments, operation 518 may involve modifying the RAID label associated with destination volume $110_{1-N}$. In one or more embodiments, operation 520 may involve initiating a CP to ensure that the modified RAID label is flushed to disk $414_{1-N}$ associated therewith. In one or more embodiments, operation 522 may involve remounting destination volume $110_{1-N}$, and operation 524 may involve thawing destination volume $110_{1-N}$. Finally, operation 526 may involve updating the relevant registry entry for destination volume $110_{1-N}$.

As seen above, in one or more embodiments, at least 3 CPs may be required during the process of converting the read-only replica to a writable destination volume $110_{1-N}$. In an example embodiment of a virtual storage partition $108_{1-N}$ supporting 20 volumes $110_{1-N}$, there may be at least 60 CPs required for the aforementioned conversion. In one or more embodiments, utilizing the replication engine in parallel threads may not mitigate the situation because the number of CPs required is not reduced. Therefore, in one or more embodiments, the process of converting a read-only replica volume to a writable volume may be inefficient.

In one or more embodiments, when clients to storage system 102 initiate I/O, "in-core" Modifications (i.e., buffer cache 420 modifications, non-volatile memory 410 modifications, and not disk $414_{1-N}$ modifications) may be performed and logged into non-volatile memory 410. In one or more embodiments, whatever is logged into non-volatile memory 410 may be accessed from memory 406 and dumped onto disk $414_{1-N}$. This process is called CP. In one or more embodiments, non-volatile memory 410 may include logs associated with not only the current volume $110_{1-N}$ in question but also all other volumes $110_{1-N}$ though which I/O was/is initiated. Therefore, in one or more embodiments, a CP may be a time-consuming process. The CP may take, for example, 2 seconds to complete when there is little load on volume $110_{1-N}$, and 16 seconds to complete when there is heavy load on volume $110_{1-N}$, for a given protocol data set. In one or more embodiments, the total time spent in CPs, remounting volumes $110_{1-N}$ and updating registry entries associated therewith may exceed application 422 timeout limits.

Referring to FIG. 2, the sum of storage space consumed by virtual volumes $208_{1-N}$ is lesser than or equal to the physical volume (analogous to aggregate 204). In one or more embodiments, aggregate 204 may utilize a "physical" VBN space configured to define a storage space of blocks provided by disks $206_{1-N}$ of the physical volume, and each virtual volume $208_{1-N}$ may utilize a "logical" virtual VBN space to organize the blocks as files. In one or more embodiments, as virtual volume $208_{1-N}$ is a logical volume, virtual volume $208_{1-N}$ may have own block allocation structures in the space associated therewith. In one or more embodiments, each virtual volume $208_{1-N}$ may be a separate file system coupled onto common storage in aggregate 204 by the storage operating system associated therewith. In one or more embodiments, a virtual volume $208_{1-N}$ utilizes the storage space of aggregate 204 only when there is data stored therein. Therefore, in one or more embodiments, the size of virtual volume $208_{1-N}$ may be expanded or shrunk according to requirements, thereby providing for increased storage efficiency.

In one or more embodiments, when a virtual volume $208_{1-N}$ is created, the "container" file thereof may be sparsely populated as most a the logical offsets may have no underlying physical storage 202. In one or more embodiments, a file system (e.g., WAFL™ file system) associated therewith may allocate physical storage 202 to the "container" file as virtual volume $208_{1-N}$ writes data to new logical offsets. In one or more embodiments, the contents of virtual volume $208_{1-N}$ may be similar to that of volume $110_{1-N}$. In one or more embodiments, analogous to file system 300, there may be a superblock located within the container file space. In one more embodiments, standard file system metadata files, analogous to those found in volume $110_{1-N}$, may be found in virtual volume $208_{1-N}$. In one or more embodiments, a virtual volume $208_{1-N}$ may include the same block allocation files as volume $110_{1-N}$. In one or more embodiments, aggregate 204 level versions of these files may be indexed by a physical VBN, and virtual volume $208_{1-N}$ level versions of these files may be indexed by a virtual VBN. Therefore, in one or more embodiments, files and the processing associated therewith may scale with logical size of virtual volume $208_{1-N}$ and not with the physical size of aggregate 204.

Figure 6:
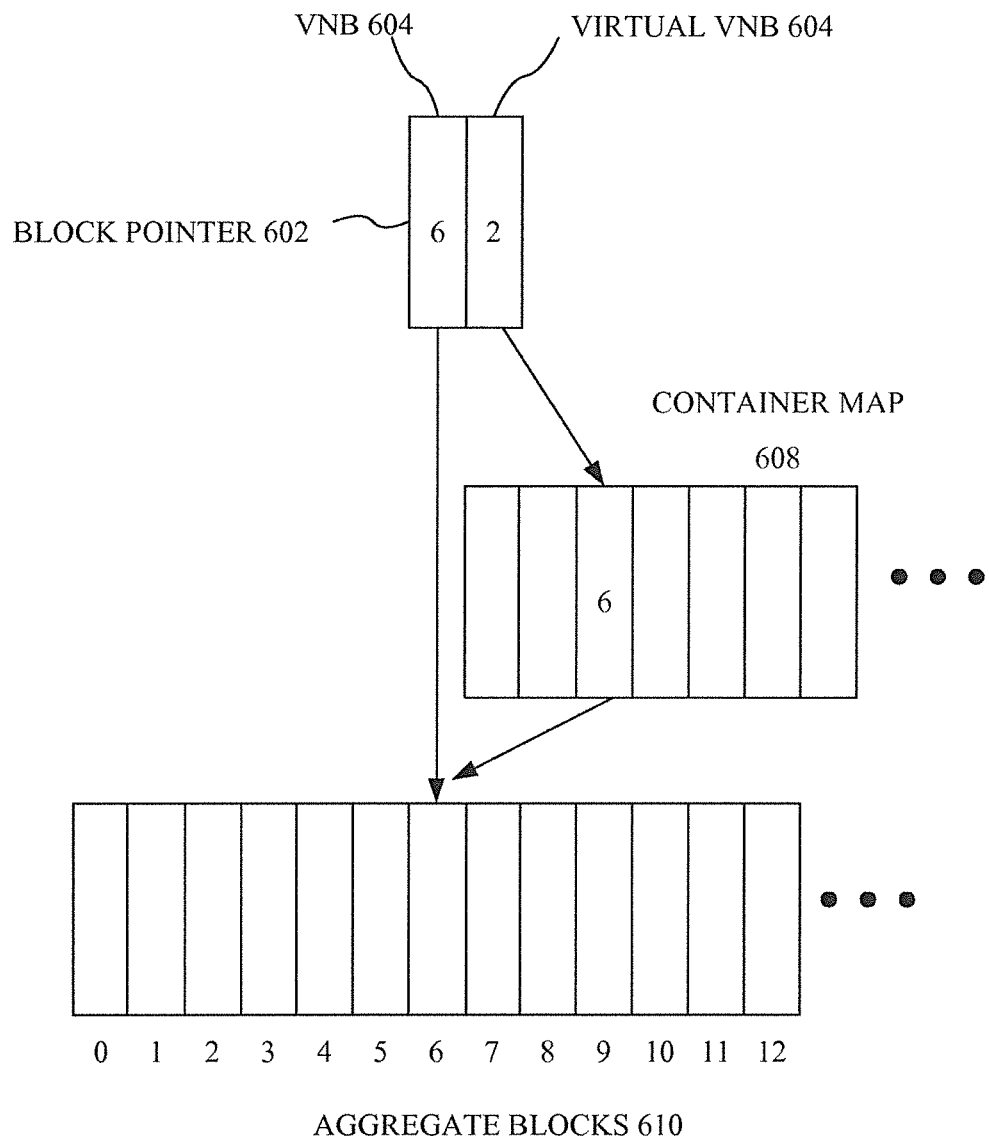
FIG. 6 is a schematic view of dual virtual volume block number (VBN) utilization in a virtual volume, according to one or more embodiments.

FIG. 6 shows dual VBN utilization in a virtual volume $208_{1-N}$, according to one or more embodiments. In one or more embodiments, each block pointer 602 in virtual volume $208_{1-N}$ may include two block addresses, viz. virtual VBN 606 and the physical VBN 604 translation thereof. In one or more embodiments, for read operations, the file system associated therewith may never need to look up physical VBNs 604 in the "container" file tree, and may merely utilize physical VBN 604 values found in the dual VBNs stored in inodes and indirect blocks of virtual volume $208_{1-N}$. In one or more embodiments, for write operations, the file system associated therewith may allocate a virtual VBN 606 from the "container" file of virtual volume $208_{1-N}$ and a physical VBN 604 from aggregate 204 thereof, and may update the file and "container" file trees accordingly.

FIG. 6 shows the block pointer 602 within virtual volume $208_{1-N}$ including two block addresses (physical VBN 604 and virtual VBN 606, with 6 and 2 as examples), according to one or more embodiments. Here, the read path is shown as bypassing container map 608, and directly going to physical VBN 6. Virtual VBN 606 of 2 is the index into container map 608, which may alternately be utilized to find physical VBN 604. In one or more embodiments, transfer of blocks from a source virtual volume $208_{1-x}$ to a destination virtual volume $208_{1-N}$ using a replication engine associated therewith may be based on virtual VBNs 606. In one or more embodiments, transfers may be independent of physical VBNs 604 involved.

It is obvious that same labels may be utilized for source virtual volume $208_{1-N}$ and destination virtual volume $208_{1-N}$ for the same reasons described above with respect to source volume $110_{1-N}$ and destination volume $110_{1-N}$. In one or more embodiments, assuming the destination as having a corresponding block pointer, a container map, and aggregate blocks analogous to the source, during transfer of a block from source to destination, the destination storage system may be configured to assign a new physical VBN thereto, and to enter the assigned new physical VBN in the destination container map. In one or more embodiments, when block pointer 602 may be copied to destination, the replication engine associated therewith may preserve the virtual VBN 606 of the source, and the block may have the same logical address within source virtual volume $208_{1-N}$ and destination virtual volume $208_{1-N}$.

In one or more embodiments, physical VBN of the destination block pointer may indicate an unknown state. In one or more embodiments, a background process may eventually replace the unknown state with the correct physical VBN. In one or more embodiments, if the file system associated therewith needs to resolve the block pointer issue prior to the physical VBN being filled in, the file system may look up the physical VBN using the container map.

In one or more embodiments, as discussed above, the process of converting a read-only replica volume $110_{1-N}$ at the destination storage system $102_D$ to a writable volume $110_{1-N}$ may be inefficient due to the number of CPs involved. Again, as discussed above, the serialization associated with the ability to only work with one volume $110_{1-N}$ at a time may prove to be a performance limitation.

However, the flexibility associated with operating virtual volumes $208_{1-N}$ may provide for parallelization of the process of converting read-only virtual volumes $208_{1-N}$ to writable virtual volumes $208_{1-N}$, as will be discussed below. In one or more embodiments, the aforementioned parallelization may enable reduction in the number of CPs involved. In one or more embodiments, data migration associated with virtual volumes $208_{1-N}$ in virtual storage partitions $108_{1-N}$ and aggregate 204 may be discussed again with reference to source storage system $102_S$ and destination storage system $102_D$ of FIG. 4. Here, in one or more embodiments, storage operating system 418 of each storage system ($102_S$, $102_D$) may be configured to implement file system associated with virtual volume $208_{1-N}$. Again, in one or more embodiments, the "write-anywhere" file system may be implemented. In one or more embodiments, disks $414_{1-N}$ may be analogous to disks $206_{1-N}$.

In one or more embodiments, data migration associated with virtual volumes $208_{1-N}$ (e.g., NetApp®'s FlexVols™) in a virtual storage partition $108_{1-N}$ is understood by one skilled in the art, and is analogous to data migration/replication with respect to volumes $110_{1-N}$. Therefore, the discussion with regard to data migration of virtual storage partitions $108_{1-N}$ including virtual volumes $208_{1-N}$ will be brief. In one or more embodiments, data migration associated with virtual volumes $208_{1-N}$ may, again, be initiated by a user at host device $104_{1-N}$ through, for example, the pressing of a button in a GUI provided on host device $104_{1-N}$.

In one or more embodiments, during the abovementioned data migration, a virtual storage partition $108_{1-N}$ may be replicated to a new storage system, and application Input/Output (I/O) may be switched to the new storage system. In one or more embodiments, the same replication engine (e.g., NetApp®'s SnapMirror™) used in data migration of virtual storage partitions $108_{1-N}$ including volumes $110_{1-N}$ may be used in data migration of virtual storage partitions $108_{1-N}$ including volumes $110_{1-N}$. However, in one or more embodiments, conversion of read-only replicas to writable volumes may involve a number of CPs, as discussed above, and may prove to be inefficient.

In one or more embodiments, data replication may again begin with the creation of a baseline copy of the file system associated with a virtual volume $208_{1-N}$ of virtual storage partition $108_{1-N}$. In one or more embodiments, the baseline copy may be transmitted to a destination virtual volume $208_{1-N}$ of a destination virtual storage partition $108_{1-N}$ associated with the destination storage system $102_D$. In one or more embodiments, scheduled and/or manually triggered updates may occur, wherein only new and changed blocks since the previous transfer may be transferred from the source file system to the destination file system and written therein. In one or more embodiments, once the baseline transfer is complete, the cutover process may occur.

Again, in one or more embodiments, at a high-level/virtual volume level, the cutover process may include effectively fencing I/O through source virtual volume $208_{1-N}$, replicating data to the destination virtual volume $208_{1-N}$/storage system $102_D$, converting the read-only replica at the destination to a writable virtual volume $208_{1-N}$, and then resuming I/O on the destination virtual volume $208_{1-N}$. It is obvious that I/O at source virtual volume $208_{1-N}$ may be resumed therein after the process of converting the read-only replica at the destination to a writable virtual volume $208_{1-N}$ is complete if data associated with source virtual volume $208_{1-N}$ is to be retained at source storage system $102_S$.

in one or more embodiments, a set of virtual volumes $208_{1-N}$ in a virtual storage partition $108_{1-N}$ may be operated on due to the flexibility associated therewith. Therefore, in one or more embodiments, converting multiple destination read-only replicas of source virtual volumes $208_{1-N}$ to writable destination virtual volumes $208_{1-N}$ may be possible, and may reduce the number of CPs involved therein.

In one or more embodiments, as soon as the cutover process may be initiated, a source virtual volume $208_{1-N}$ I/O may be fenced through an API associated with a file system at source storage system $102_S$. In one or more embodiments, the "in-core" data associated with source virtual volume $208_{1-N}$ on source storage system $102_S$ (e.g., data in buffer cache 420, non-volatile memory 410, and not in disks $414_{1-N}$) may then be unloaded to the corresponding disk $414_{1-N}$. Meanwhile, in one or more embodiments, data from source virtual volume $208_{1-N}$ may be replicated to destination virtual volume $208_{1-N}$ on destination storage system $102_D$ as discussed above. In one or more embodiments, as soon as the baseline transfer is done, the semi-synchronous transfer discussed above may begin.

In one or more embodiments, during the data replication process, the replication engine may mark the destination virtual volume $208_{1-N}$ as a replica through a replica flag (e.g., a bit/a few bits). In one or more embodiments, this may allow for the destination virtual volume $208_{1-N}$ to be a "read-only" replica, thereby rendering data associated therewith unalterable. In one or more embodiments, the relationships between source virtual volume $208_{1-N}$ and the destination read-only replica may be included in control file(s) that are part of the replication engine.

Then, in one or more embodiments, the process of converting the read-only replica at the destination to a writable volume may be started. For the aforementioned function, in one or more embodiments, the replication engine relationships between source virtual volume $208_{1-N}$ and the destination read-only replica may need to be broken. In other words, the replica flag associated with the read-only replica may need to be cleared. In one or more embodiments, during the process of converting from a read-only replica to a writable volume, I/O (e.g., through a client/user of host device $104_{1-N}$) to destination virtual volume $208_{1-N}$ may again be queued until the process is complete, and requests may then be served in the order in which they were received/in a priority order. In one or more embodiments, at the volume level, destination virtual volume $208_{1-N}$ may be "frozen." In one or more embodiments, this may be achieved through an API associated with destination file system.

In one or more embodiments, in contrast to being able to operate on one volume at a time, all destination virtual volumes $208_{1-N}$ associated with aggregate 204 in virtual storage partition $108_{1-N}$ may be "frozen," and the "in-core" state of all the destination virtual volumes $208_{1-N}$ may be unloaded to disks $414_{1-N}$ associated therewith. In one or more embodiments, for each virtual volume $208_{1-N}$ in aggregate 204, the superblock of the destination file system associated with the read-only replica may be stored in aggregate 204 at the destination. In one or more embodiments, one or more physical VBNs may be associated therewith, and one or more virtual VBNs may specify the superblock's offset within the container file associated therewith. In one or more embodiments, this superblock may then first be read at the destination storage system. $102_D$. Then, in one or more embodiments, the replica flag associated therewith may be cleared, and the superblock may be modified "in-core," i.e., not at disks $414_{1-N}$.

For example, the modification may be in the form of the replication engine writing metadata that indicates the read/writable status of destination virtual volume 204 N. Then, in one or more embodiments, the virtual VBN of superblock associated with the read-only replica may now be modified to associate with the new modified superblock. In one or more embodiments, in contrast with the conversion described above with regard to volumes $110_{1-N}$, no CPs may be initiated for reasons that will be described below. In one or more embodiments, then the new modified superblock may be associated with another virtual VBN (e.g., one of the virtual VBNs specifying the superblock's offset within the container file associated therewith) for redundancy/fault-tolerance purposes. Again, in one or more embodiments, no CPs may be initiated. Now, for example, the modified superblocks may have two consecutive virtual VBNs associated therewith.

In one or more embodiments, the disk group label (e.g., RAID label) indicating the association of disks $414_{1-N}$ with the destination virtual volume $208_{1-N}$ may be appropriately modified "in-core" (e.g., at non-volatile memory 410, at buffer cache 420) at the destination storage system 102. In one or more embodiments, the abovementioned operations may be repeated for all virtual volumes $208_{1-N}$ within aggregate 204 in virtual storage partition $108_{1-N}$. In one or more embodiments, in order to ensure that the superblocks for all virtual volumes $208_{1-N}$ and the modified disk group labels are unloaded/flushed to disk $414_{1-N}$, a CP may be triggered (e.g., manually). In one or more embodiments, virtual VBNs of virtual volumes $208_{1-N}$ in aggregate 204 may be translated to physical VBNs specifying the location of virtual volumes $208_{1-N}$ within aggregate 204 to enable writing blocks of virtual volumes $208_{1-N}$ to disks $414_{1-N}$. Now, in one or more embodiments, all destination virtual volumes $208_{1-N}$ may then be remounted in parallel in separate threads through the destination file system associated therewith. In one or more embodiments, the destination virtual volumes $208_{1-N}$ may then be thawed, i.e., "unfrozen." Finally, in one or more embodiments, the registry entries associated with all virtual volumes $208_{1-N}$ in non-volatile memory 410 of the destination storage system $102_D$ may be updated in a single registry transaction.

In one or more embodiments, the number of CPs may be reduced to 1 for all virtual volumes $208_{1-N}$ within an aggregate 204 associated with a virtual storage partition $108_{1-N}$. In one or more embodiments, therefore, the number of CPs may be independent of the number of virtual volumes $208_{1-N}$. Also, in one or more embodiments, remounting virtual volumes $208_{1-N}$ in parallel in separate threads may reduce the overall time required for remounting virtual volumes $208_{1-N}$. Therefore, in one or more embodiments, the overall time may be independent of the number of virtual volumes $208_{1-N}$. In one or more embodiments, a registry update may be a costly operation associated non-volatile memory 410. In one or more embodiments, the abovementioned batching of registry operations (i.e., by updating the registry entries for all virtual volumes $208_{1-N}$ in one registry transaction) may be independent on the number of virtual volumes $208_{1-N}$. Thus, in one or more embodiments, the total time spent in the aforementioned processes may not exceed the time limit imposed by application 422 timeouts.

In one or more embodiments, as the time required for remounting virtual volumes $208_{1-N}$ is independent of the number of virtual volumes $208_{1-N}$, the number of virtual volumes $208_{1-N}$ supported by a data migration process including the abovementioned process of converting a read-only replica at the destination to a writable volume may be increased. Also, in one or more embodiments, virtual storage partition $108_{1-N}$ data migration may be faster than in the process described in FIG. 5.

In one or more embodiments, as discussed above, after modifying the superblock "in-core" on the destination, the superblock may be written at two VBNs. In one or more embodiments, assuming that the file server panics in between, the following situations may occur, viz. (i) both superblocks at the two VBNs were flushed to disk $414_{1-N}$, (ii) one of the superblocks was flushed to disk $414_{1-N}$ but not the other, (iii) none of the superblocks were flushed to disk $414_{1-N}$, and (iv) both superblocks were partially written to disk $414_{1-N}$. In one or more embodiments, in the case of virtual volumes $208_{1-N}$, (i) and (ii) may result in the file system associated therewith selecting the correct superblock for a virtual volume $208_{1-N}$. Therefore, in one or more embodiments, virtual volume $208_{1-N}$ at the destination may become writable. In one or more embodiments, in the case of virtual volumes $204_N$, (iii) and (iv) may result in aggregate 204 still being at the previous CP as the aggregate 204 superblock was not flushed to disk $414_{1-N}$. Thus, in one or more embodiments, virtual volume $208_{1-N}$ at the destination may still remain a replica.

In one or more embodiments, in the case of volumes $110_{1-N}$, (iv) may result in both superblocks being corrupt due to the CPs involved therein. Therefore, in one or more embodiments, the destination file system 300 may not be able to mount destination volume $110_{1-N}$. Thus, in one or more embodiments, if pre-checks carried out on all virtual volumes $208_{1-N}$ fail for any of virtual volumes $208_{1-N}$, all virtual volumes $208_{1-N}$ may still remain replica virtual volumes $208_{1-N}$.

Figure 7:
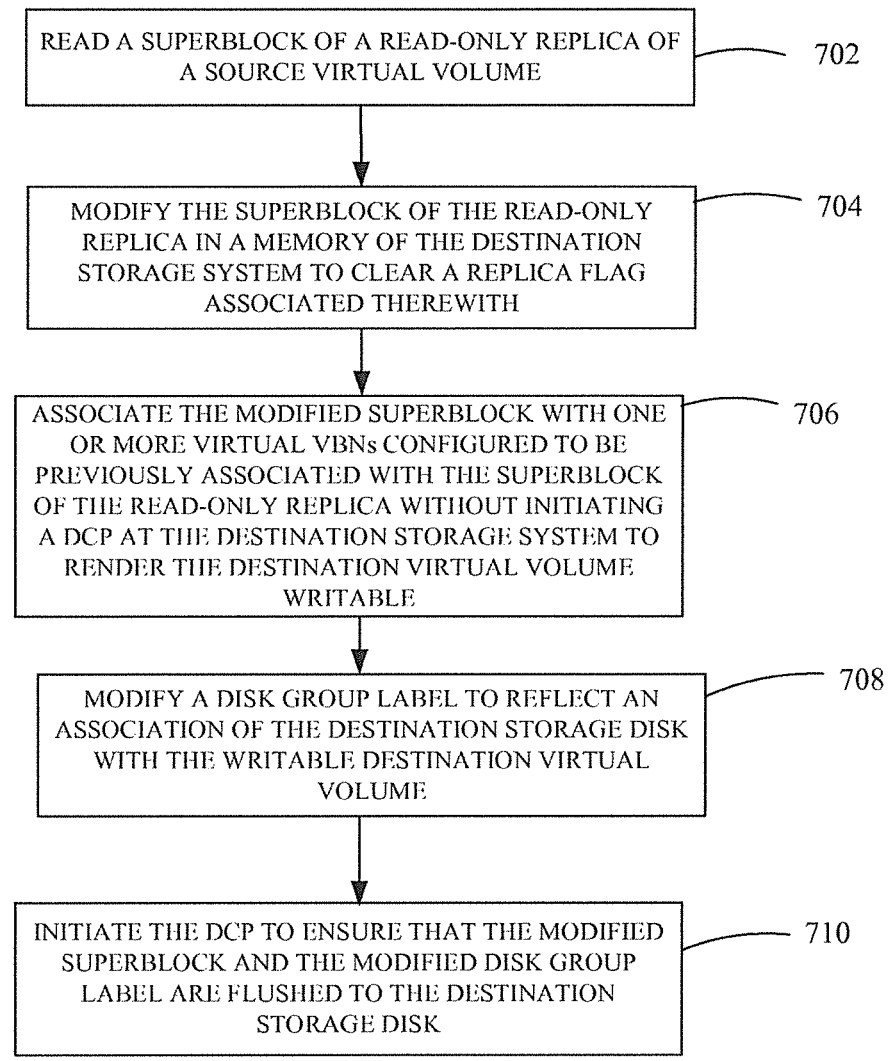
FIG. 7 is a process flow diagram detailing the operations involved in a method of converting a read-only replica of a source virtual volume at the destination storage system to a writable destination virtual volume, according to one or more embodiments.

FIG. 7 is a process flow diagram detailing the operations involved in a method of converting a read-only replica of a source virtual volume $208_{1-N}$ at the destination storage system $102_D$ to a writable destination virtual volume $208_{1-N}$, according to one or more embodiments. In one or more embodiments, operation 702 may involve reading, through a file system at the destination storage system $102_D$, a superblock of the read-only replica of the source virtual volume $208_{1-N}$ in a source virtual storage partition $108_{1-N}$ associated with a source aggregate 204 of a source storage system $102_S$ at the destination storage system $102_D$. In one or more embodiments, the read-only replica of the source virtual volume $208_{1-N}$ may have been transferred from the source storage system $102_S$ to a destination virtual storage partition $108_{1-N}$ associated with a destination aggregate 204 at the destination storage system $102_D$ through a replication engine associated with the source storage system $102_S$ and the destination storage system $102_D$.

In one or more embodiments, the source virtual volume $208_{1-N}$ and the read-only replica at the destination virtual storage partition $108_{1-N}$ are respectively abstracted from an underlying source storage disk $414_{1-N}$ associated with the source storage system $102_S$ and an underlying destination storage disk $414_{1-N}$ associated with the destination storage system $102_D$ through the source aggregate 204 and the destination aggregate 204 inside which the source virtual volume $208_{1-N}$ and the destination virtual volume $208_{1-N}$ signifying the read-only replica are created. In one or more embodiments, the source virtual storage partition $208_{1-N}$ and the destination virtual storage partition $208_{1-N}$ are, respectively, secure logical partitions of the source storage system $102_S$ and the destination storage system $102_D$ created by an operating system associated therewith.

In one or more embodiments, operation 704 may involve modifying the superblock of the read-only replica in a memory of the destination storage system $102_D$ to clear a replica flag associated therewith through the replication engine. In one or more embodiments, operation 706 may involve associating, through the file system at the destination storage system $102_D$, the modified superblock with one or more virtual VBNs configured to be previously associated with the superblock of the read-only replica of the source virtual volume $208_{1-N}$ of the source storage system $102_S$ without initiating a destination consistency point (DCP) at the destination storage system $102_D$ to render the destination virtual volume $208_{1-N}$ writable.

In one or more embodiments, the virtual VBN may be configured to index a virtual volume level version of block allocation files of a virtual volume including the source virtual volume $208_{1-N}$ and/or the destination virtual volume $208_{1-N}$, and the DCP may define a process during which an operating system associated with the destination storage system $102_D$ flushes data changes in the memory of the destination storage system $102_D$ to the destination storage disk $414_{1-N}$ associated with the destination storage system $102_D$.

In one or more embodiments, operation 708 may involve modifying a disk group label indicating an association of the destination storage disk $414_{1-N}$ with the read-only replica of the source virtual volume $208_{1-N}$ of the source storage system $102_S$ to reflect an association of the destination storage disk $414_{1-N}$ with the writable destination virtual volume $208_{1-N}$. In one or more embodiments, operation 710 may then involve initiating the DCP to ensure that the modified superblock and the modified disk group label associated with the writable destination virtual volume $208_{1-N}$ are flushed to the destination storage disk $414_{1-N}$.

Figure 8:
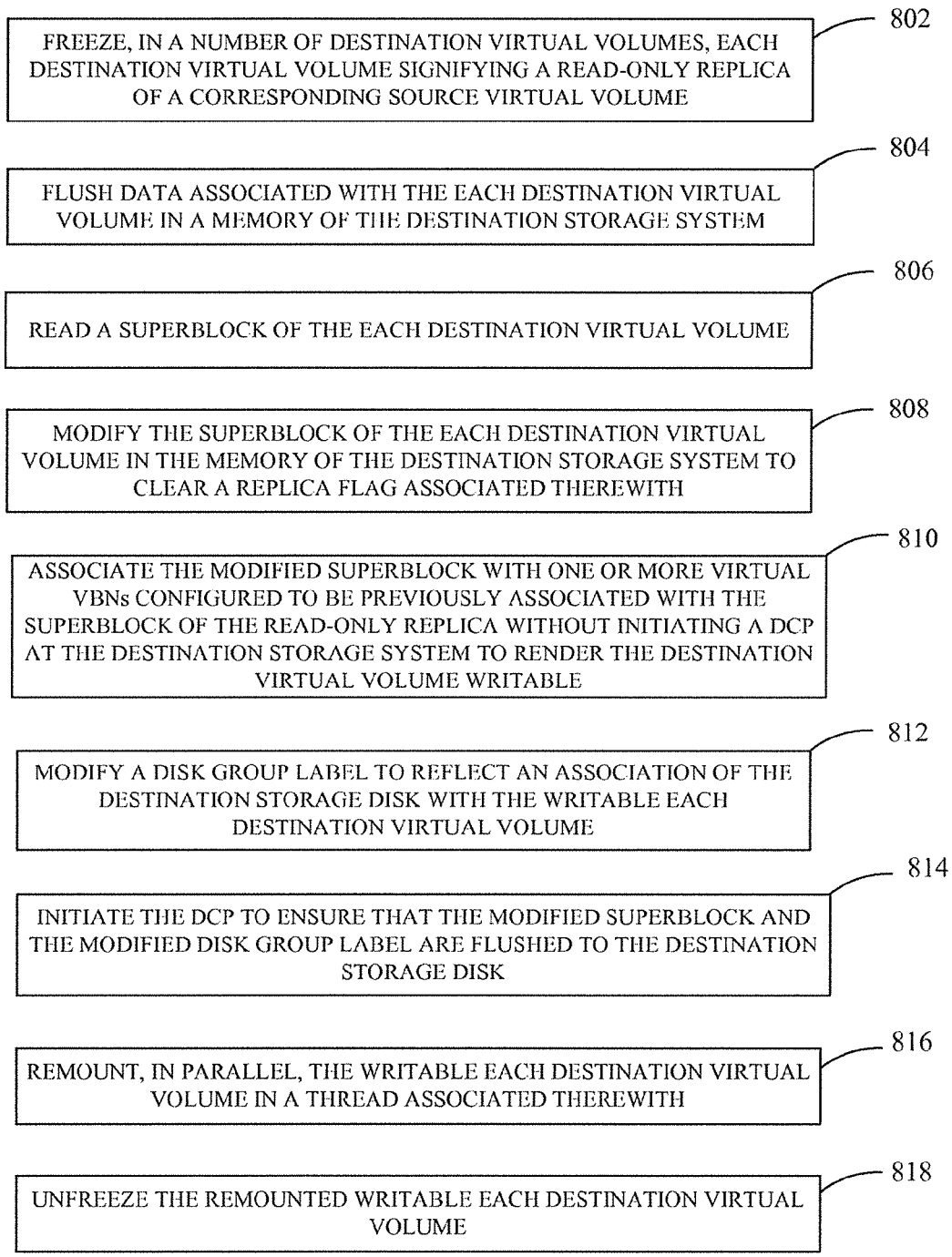
FIG. 8 is a process flow diagram detailing the operations involved in a method of parallely converting read-only replicas of source virtual volumes to writable destination virtual volumes, according to one or more embodiments.

FIG. 8 is a process flow diagram detailing the operations involved in a method of parallely converting read-only replicas of source virtual volumes $208_{1-N}$ to writable destination virtual volumes $208_{1-N}$, according to one or more embodiments. In one or more embodiments, operation 802 may involve freezing, in a number of destination virtual volumes $208_{1-N}$ of a destination virtual storage partition $108_{1-N}$ associated with a destination aggregate 204 of a destination storage system $102_D$, each destination virtual volume $208_{1-N}$ signifying a read-only replica of a corresponding source virtual volume $208_{1-N}$ in a source virtual storage partition $108_{1-N}$ associated with a source aggregate 204 of a source storage system $102_S$ at the destination storage system $102_D$ through a file system associated therewith.

In one or more embodiments, the freezing is configured to queue a subsequent external request through a client device to access data associated with the each destination virtual volume $204_{1-N}$. In one or more embodiments, the read-only replica of the corresponding source virtual volume $208_{1-N}$ may be transferred from the source storage system $102_S$ to the each destination virtual volume $208_{1-N}$ through a replication engine associated with the source storage system $102_S$ and the destination storage system $102_D$. The corresponding source virtual volume $208_{1-N}$ and the each destination virtual volume $208_{1-N}$ are respectively abstracted from an underlying source storage disk $414_{1-N}$ associated with the source storage system $102_S$ and an underlying destination storage disk $414_{1-N}$ associated with the destination storage system $102_D$ through the source aggregate 204 and the destination aggregate 204 inside which the corresponding source virtual volume $208_{1-N}$ and the each destination virtual volume $208_{1-N}$ are created.

In one or more embodiments, the source virtual storage partition $108_{1-N}$ and the destination virtual storage partition $108_{1-N}$ are, respectively, secure logical partitions of the source storage system $102_S$ and the destination storage system $102_D$ created by an operating system associated therewith. In one or more embodiments, operation 804 may involve flushing data associated with the each destination virtual volume $208_{1-N}$ in a memory of the destination storage system $102_D$ to the destination storage disk $414_{1-N}$. In one or more embodiments, operation 806 may involve reading, through the file system at the destination storage system $102_D$, a superblock of the each destination virtual volume $208_{1-N}$. In one or more embodiments, operation 808 may involve modifying the superblock of the each destination virtual volume $208_{1-N}$ in the memory of the destination storage system $102_D$ to clear a replica flag associated therewith through the replication engine.

In one or more embodiments, operation 810 may involve associating, through the file system at the destination storage system $102_D$, the modified superblock with one or more virtual VBNs configured to be previously associated with the read-only replica of the corresponding source virtual volume $208_{1-N}$ without initiating a DCP at the destination storage system $102_D$ to render the each destination virtual volume $208_{1-N}$ writable. In one or more embodiments, operation 812 may involve modifying a disk group label indicating an association of the destination storage disk $414_{1-N}$ with the read-only replica of the corresponding source virtual volume $208_{1-N}$ to reflect an association of the destination storage disk $414_{1-N}$ with the writable each destination virtual volume $208_{1-N}$.

In one or more embodiments, the virtual VBN is configured to index a virtual volume level version if block allocation files of a virtual volume including the corresponding source virtual volume $208_{1-N}$ and/or the each destination virtual volume $208_{1-N}$. The DCP defines a process during which an operating system associated with the destination storage system $102_D$ flushes data changes in the memory of the destination storage system $102_D$ to the destination storage disk $414_{1-N}$ associated with the destination storage system $102_D$.

In one or more embodiments, operation 814 may involve initiating the DCP to ensure that the modified superblock and the modified disk group label associated with the writable each destination virtual volume $208_{1-N}$ are flushed to the destination storage disk $414_{1-N}$. In one or more embodiments, operation 816 may involve remounting, in parallel, the writable each destination virtual volume $208_{1-N}$ in a thread associated therewith through the file system associated therewith. In one or more embodiments, operation 818 may involve unfreezing the remounted writable each destination virtual volume $208_{1-N}$ through the file system associated therewith.

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A machine implemented method, comprising:
transferring a superblock of a read-only replica of a source virtual volume from a source storage system to a destination virtual volume at a destination storage system, where the superblock includes information regarding the read-only replica;
modifying the superblock of the read-only replica in a memory of the destination storage system to clear a replica flag associated therewith for converting the read-only replica of the source virtual volume to a writable destination virtual volume at the destination storage system;
associating the modified superblock with at least one virtual volume block number (virtual VBN) configured to be previously associated with the superblock of the read-only replica of the source virtual volume of the source storage system without initiating a destination consistency point (DCP) at the destination storage system to render the destination virtual volume writable, wherein the virtual VBN is configured to index a virtual volume level version of block allocation files of a virtual volume including the source virtual volume and the destination virtual volume;
modifying a device group label indicating an association of a destination storage device with the read-only replica of the source virtual volume of the source storage system to reflect an association of the destination storage device with the writable destination virtual volume; and
storing the modified superblock and the modified device group label associated with the writable destination virtual volume to the destination storage device.

2. The method of claim 1, further comprising:
freezing the read-only replica of the source virtual volume at the destination storage system to queue a subsequent external request through a client device to access data associated with the read-only replica of the source virtual volume; and
flushing data associated with the read-only replica of the source virtual volume in the memory of the destination storage system to the destination storage device prior to reading and modifying the superblock of the read-only replica of the source virtual volume at the destination storage system.

3. The method of claim 1, further comprising:
transferring a baseline copy of the source virtual volume to the destination virtual volume as part of a migration operation, the baseline copy being a read-only, point-in-time image of a file system associated with the source virtual volume;
marking the destination virtual volume as a read-only replica by a replication engine;
updating the destination virtual volume with new and changed data blocks of the source virtual volume when compared to a previous transfer; and
transmitting a list of data blocks from the source virtual volume to the destination virtual volume.

4. The method of claim 1, further comprising:
updating, in the memory of the destination storage system, relevant registry entries associated with the writable destination virtual volume.

5. The method of claim 4, further comprising:
resuming processing of input/output requests through the source virtual volume after the registry update in the memory of the destination storage system.

6. The method of claim 1, wherein the source virtual volume is at a source virtual storage partition associated with a source aggregate of the source storage system.

7. A non-transitory machine readable storage medium having stored thereon instructions, which when executed by at least one machine, causes the machine to perform a method, the method comprising:
transferring a superblock of a read-only replica of a source virtual volume from a source storage system to a destination virtual volume at a destination storage system, where the superblock includes information regarding the read-only replica;
modifying the superblock of the read-only replica in a memory of the destination storage system to clear a replica flag associated therewith for converting the read-only replica of the source virtual volume to a writable destination virtual volume at the destination storage system;
associating the modified superblock with at least one virtual volume block number (virtual VBN) configured to be previously associated with the superblock of the read-only replica of the source virtual volume of the source storage system without initiating a destination consistency point (DCP) at the destination storage system to render the destination virtual volume writable, wherein the virtual VBN is configured to index a virtual volume level version of block allocation files of a virtual volume including the source virtual volume and the destination virtual volume;
modifying a device group label indicating an association of a destination storage device with the read-only replica of the source virtual volume of the source storage system to reflect an association of the destination storage device with the writable destination virtual volume; and
storing the modified superblock and the modified device group label associated with the writable destination virtual volume to the destination storage device.

8. The non-transitory machine readable storage medium of claim 7, further comprising:
freezing the read-only replica of the source virtual volume at the destination storage system to queue a subsequent external request through a client device to access data associated with the read-only replica of the source virtual volume; and
flushing data associated with the read-only replica of the source virtual volume in the memory of the destination storage system to the destination storage device prior to reading and modifying the superblock of the read-only replica of the source virtual volume at the destination storage system.

9. The non-transitory machine readable storage medium of claim 7, further comprising:
  transferring a baseline copy of the source virtual volume to the destination virtual volume as part of a migration operation, the baseline copy being a read-only, point-in-time image of a file system associated with the source virtual volume;
  marking the destination virtual volume as a read-only replica by a replication engine;
  updating the destination virtual volume with new and changed data blocks of the source virtual volume when compared to a previous transfer; and
  transmitting a list of data blocks from the source virtual volume to the destination virtual volume.

10. The non-transitory machine readable storage medium of claim 9, further comprising:
  updating, in the memory of the destination storage system, relevant registry entries associated with the writable destination virtual volume.

11. The non-transitory machine readable storage medium of claim 9, further comprising:
  resuming processing of input/output requests through the source virtual volume after the registry update in the memory of the destination storage system.

12. The non-transitory machine readable storage medium of claim 7, wherein the source virtual volume is at a source virtual storage partition associated with a source aggregate of the source storage system.

13. A system, comprising:
  a memory of a destination storage system having stored thereon instructions; and
  a processor, coupled to the memory of the destination storage system, using the instructions stored in the memory for:
    receiving from a source storage system a superblock of a read-only replica of a source virtual volume for a destination virtual volume at the destination storage system, where the superblock includes information regarding the read-only replica;
    modifying the superblock of the read-only replica in the memory to clear a replica flag associated therewith for converting the read-only replica of the source virtual volume to a writable destination virtual volume at the destination storage system;
    associating the modified superblock with at least one virtual volume block number (virtual VBN) configured to be previously associated with the superblock of the read-only replica of the source virtual volume of the source storage system without initiating a destination consistency point (DCP) at the destination storage system to render the destination virtual volume writable, wherein the virtual VBN is configured to index a virtual volume level version of block allocation files of a virtual volume including the source virtual volume and the destination virtual volume;
    modifying a device group label indicating an association of a destination storage device with the read-only replica of the source virtual volume of the source storage system to reflect an association of the destination storage device with the writable destination virtual volume; and
    storing the modified superblock and the modified device group label associated with the writable destination virtual volume to the destination storage device.

14. The system of claim 13, wherein the processor further executing instructions for:
  freezing the read-only replica of the source virtual volume at the destination storage system to queue a subsequent external request through a client device to access data associated with the read-only replica of the source virtual volume; and
  flushing data associated with the read-only replica of the source virtual volume in the memory of the destination storage system to the destination storage device prior to reading and modifying the superblock of the read-only replica of the source virtual volume at the destination storage system.

15. The system of claim 13, wherein the processor further executing instructions for:
  transferring a baseline copy of the source virtual volume to the destination virtual volume as part of a migration operation, the baseline copy being a read-only, point-in-time image of a file system associated with the source virtual volume;
  marking the destination virtual volume as a read-only replica by a replication engine;
  updating the destination virtual volume with new and changed data blocks of the source virtual volume when compared to a previous transfer; and
  transmitting a list of data blocks from the source virtual volume to the destination virtual volume.

16. The system of claim 15, wherein the processor further executing instructions for:
  updating, in the memory of the destination storage system, relevant registry entries associated with the writable destination virtual volume.

17. The system of claim 15, wherein the processor further executing instructions for:
  resuming processing of input/output requests through the source virtual volume after the registry update in the memory of the destination storage system.

18. The system of claim 15, wherein the source virtual volume is at a source virtual storage partition associated with a source aggregate of the source storage system.

* * * * *